Nov. 7, 1967 R. P. SPRAGUE 3,351,380
INFANT CARRIER FOR USE WITH SHOPPING CARTS
Filed May 26, 1966 2 Sheets-Sheet 2
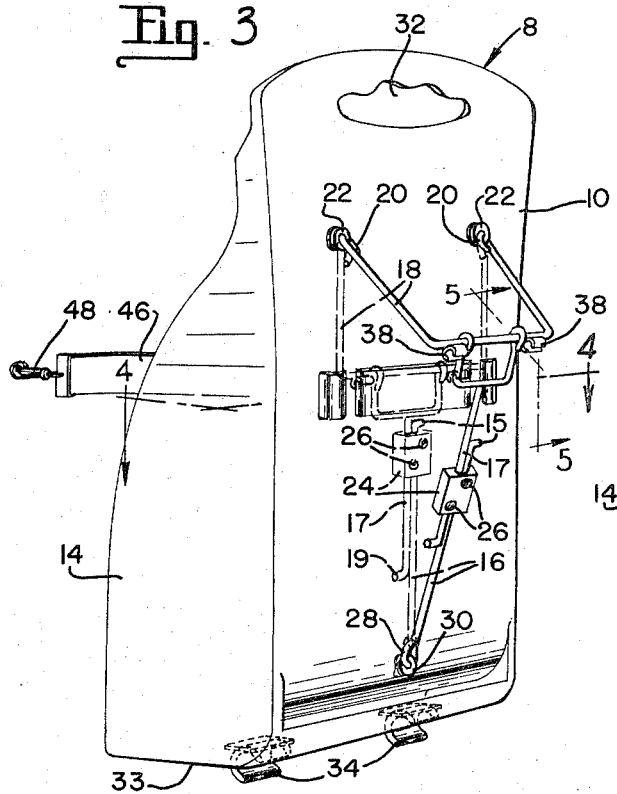
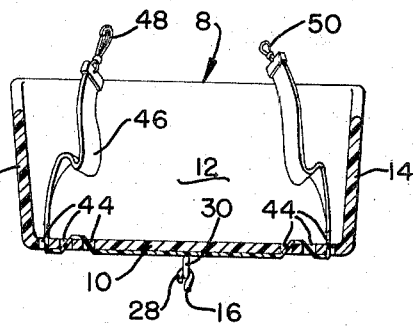
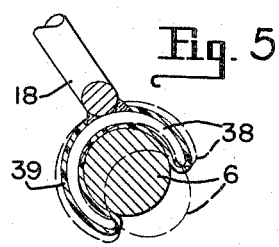
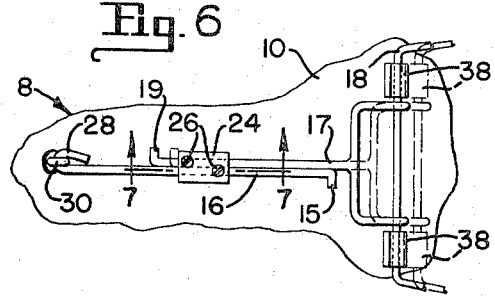
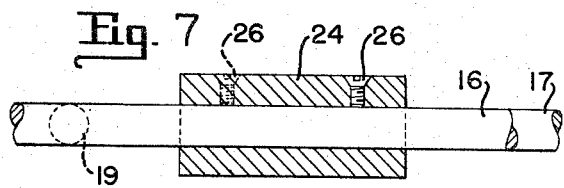
ROBERT PAUL SPRAGUE
*INVENTOR.*
BY
Wayland D. Keith
HIS AGENT

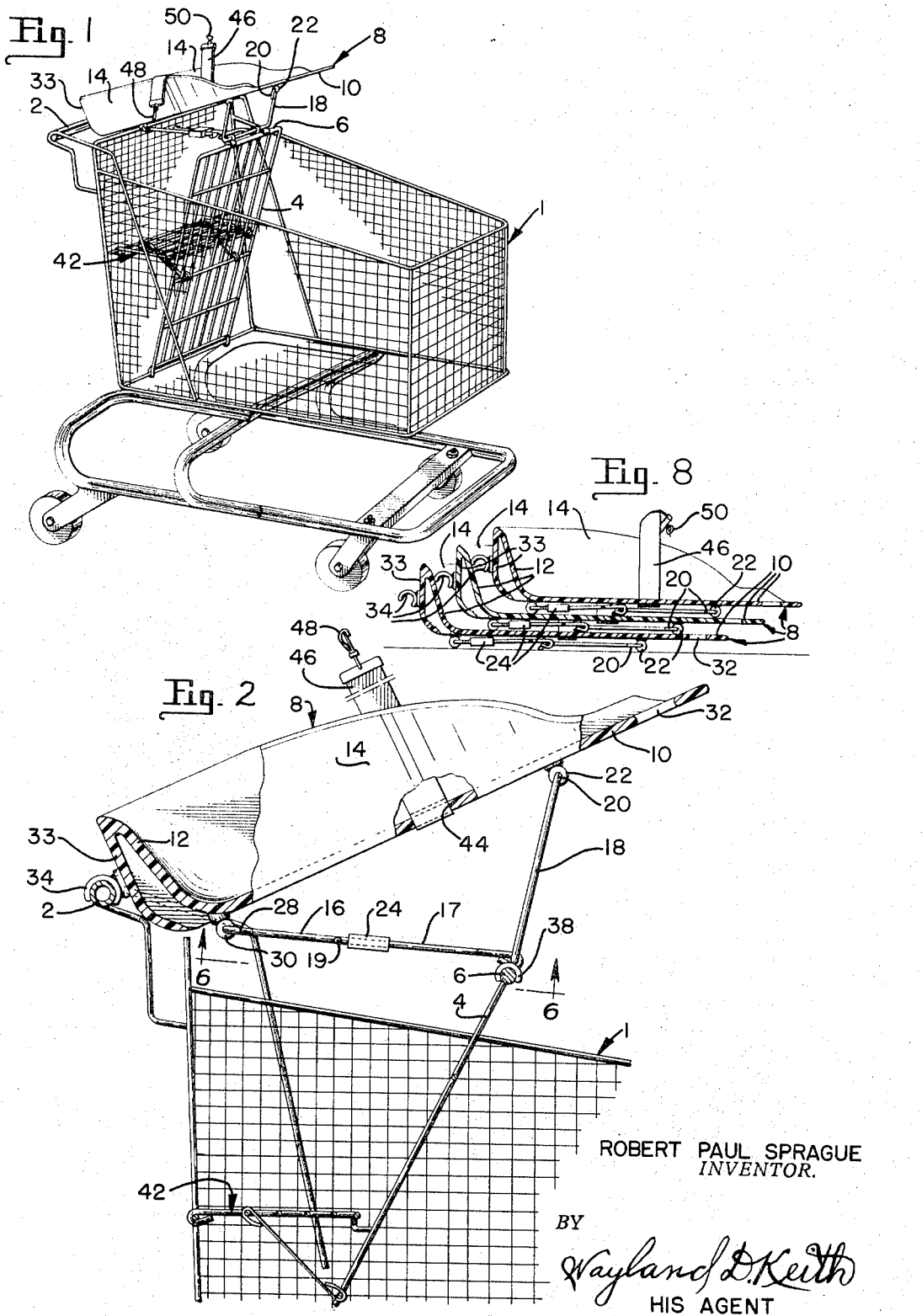

United States Patent Office 3,351,380
Patented Nov. 7, 1967

3,351,380
INFANT CARRIER FOR USE WITH
SHOPPING CARTS
Robert Paul Sprague, 2916 Elmhurst,
Oklahoma City, Okla. 73120
Filed May 26, 1966, Ser. No. 553,096
4 Claims. (Cl. 297—377)

ABSTRACT OF THE DISCLOSURE

An adjustable, folding infant carrier to be used on a shopping cart, which carrier may be readily attached to or detached from the shopping cart. The carrier will support the infant in reclining position, at the desired angle with respect to the shopping cart and provision is made to secure the infant within the carrier. Provision is also made for collapsing the support member of the carrier to enable a multiplicity of carriers to be nested in a minimum of space for storage or for shipment.

---

This invention relates to improvements in infant carriers and more particularly to an infant carrier for use with the conventional shopping cart, such as used in supermarkets and the like, which infant carrier allows the infant to be carred in a reclining position.

Various infant carriers have been proposed heretofore, but these, for the most part, were carried in the arms, which carriers were not readily adaptable for use with the shopping carts. The present infant carrier is so constructed that it may be readily attached to or detached from shopping carts of various constructions, and which infant carrier has an attaching instrumentality associated therewith which is readily adjustable to fit the shopping carts in such manner that the infant carrier may be attached at the proper angle to give greatest comfort to the infant, and with a minimum of effort in making the adjustments.

An object of this invention is to provide an infant carrier for a shopping cart which carrier may be readily attached to or detached from the shopping cart, yet will support and hold the infant in a comfortable, reclining position, and in which carrier the infant may be securely strapped to prevent the infant from accidentally falling from the carrier.

Another object of this inventon is to provide an infant carrier which readily clips onto portions of the shopping cart to support the infant in the correct position.

Still another object of the invention is to provide an infant carrier for attachment to a shopping cart, which carrier may be readily removed and collapsed in such manner as to require a minimum of space.

A further object of the invention is to provide an infant carrier for a shopping cart, which carrier is of such construction that multiple units may be nested together in telescoped relation to require a minimum of storage space.

Another object of the invention is to provide an infant carrier of monocoque construction, which is sturdy in design and light in weight.

Still another object of the invention is to provide an infant carrier which may normally be attached to a shopping cart, and which carrier may be readily detached from the shopping cart with the infant therein, and moved from place to place.

A further object of the invention is to provide an infant carrier for shopping carts that is of monocoque construction of a plastic or plastic and reinforcing material such as fiberglass.

A still further object of the invention is to provide an infant carrier which may be used with shopping carts, which carrier is simple in construction, easy to assemble and disassemble, easy to install onto or remove from a shopping cart, and which is low in the cost of manufacture.

With these objects in mind and others which will become manifest as the description proceeds, reference is to be had to the accompanying drawings in which like reference characters designate like parts in the several views thereof, in which:

FIG. 1 is a perspective view of a conventional shopping cart, showing the infant carrier installed thereon;

FIG. 2 is a fragmentary sectional view of a shopping cart, on an enlarged scale, showing the infant carrier installed thereon, with parts being broken away and shown in section to bring out the details of construction;

FIG. 3 is a perspective view showing a bottom and side portion of the infant carrier, showing the bottom support members in full outline ready for attachment to a shopping cart and which members are shown in dashed outline in telescoped or retracted position for storage or nesting with other infant carriers;

FIG. 4 is a sectional view taken on line 4—4 of FIG. 3, looking in the direction indicated by the arrows, and showing the manner in which the safety belt is installed;

FIG. 5 is an enlarged sectional view taken on line 5—5 of FIG. 3, looking in the direction indicated by the arrows, with parts broken away and shown in section to bring out the details of construction, and with parts shown in dashed outline to emphasize the resiliency of the spring clip members;

FIG. 6 is a sectional view taken on line 6—6 of FIG. 2, looking in the direction indicated by the arrows, with portions broken away and with portions shown in dashed outline to show the manner of making adjustments;

FIG. 7 is a sectional view taken on line 7—7 of FIG. 6, looking in the direction indicated by the arrows; and FIG. 8 is a side elevational view, with parts broken away and shown in section, of several infant carriers as nested together for storage or shipment.

With more detailed reference to the drawing, the numeral 1 designates generally a conventional shopping cart having a handle 2 and a foldable partition member 4 within the cart proper, which partition member 4 has a rail 6 across the upper end thereof.

The infant carrier is designated generally by the numeral 8 and is preferably of a monocoque construction of plastic, pressed metal, or the like, and is preferably constructed with the bottom portion 10 and end portion 12 which end portion slopes upward and rearward with respect to the shopping cart 1 when installed thereon, and it is preferable to have sides 14 joined with the end portion 12 with the opposite end of the infant carrier 8 open. The sides 14 and end portion 12 are joined with the bottom portion 10.

By having the sides 14 and end 12 flared upwardly and outwardly with respect to bottom 10, the carrier units may be nested together as shown in FIG. 8, in compact relation for shipping or storing, when rods 16 and 17 are telescoped, as indicated in dashed outline in FIG. 3, the space occupied by rods 16 and 17 and support brace 18 will be minimized. The support brace 18 is preferably a U-shaped member and has a loop 20 on each upper end thereof, which loops engage eyes 22 which are anchored within the bottom of the monocoque structure.

The rods 16 and 17 pass through a longitudinally apertured member 24, positioned thereon, and are held in adjusted relation by set screws 26, which are screw threaded into the longitudinally apertured member 24 so that the set screws 26 will intersect the rods 16 and 17 to secure the rods against longitudinal movement thereby to form an adjustable linkage. However, when it is desired to telescope the rods in relation to each other, so that the rods 16 and 17 as well as the U-shaped support brace 18 will occupy a minimum of space; these set screws 26 are loosened, and the U-shaped support brace 18 and rods 16 and 17 will occupy the position as shown in dashed outline in FIG. 3. The rod 16 has an out-turned end 15, and the rod 17 has an out-turned end 19, as shown in FIGS. 3 and 6, to prevent accidental disassembly of the rods with respect to the longitudinally apertured member 24. The other end of rod 16 has a loop 28 thereon, which loop complementally engages an eye 30 that is inset within the monocoque structure of the infant carrier 8. The bottom portion 10 preferably has a hand-hole 32 in one end thereof to enable ready handling of the infant carrier 8 and the installation and removal thereof from shopping cart 1.

The rear face 33 of end portion 12, of the infant carrier 8, has a pair of spaced apart, axially aligned spring clips 34 secured thereto, each spring clip is preferably covered with a plastic or elastomer covering to increase the friction when the clip is attached to transverse handle bar 2 of shopping cart 1. The spring clip 34 is arcuate and of more than 180°, but has an opening between the lips thereof of sufficient width to enable the ready insertion onto and the removal of the clip from transverse handle bar 2. Clips 38, similar in construction to spring clips 34, are attached to the transverse portion of the U-shaped support brace 18, which clips 38 are likewise spaced apart and are positioned to bindingly engage a transverse bar 40 positioned on the forward side of the baby carrying seat 42 of shopping cart 1, when the baby seat is in the position as shown in FIGS. 1 and 2. The clips 38 are likewise covered with an elastomer covering, such as plastic, as indicated at 39. The clips 38 may be secured to the transverse bar of U-shaped support brace 18 as by welding, soldering, or the like.

Upon loosening of set screws 26 in longitudinally apertured member 24, the U-shaped support brace 18, carrying clips 38, and the bars 16 and 17 may be moved into the position as shown in dashed outline in FIG. 3. Therefore, when one infant carrier 8 is nested in another infant carrier 8, only the thickness of the clips 38, rod 16, and eyes 22 and 30 will hold the infant carriers 8 apart. In this manner, a considerable number of infant carriers 8 may be readily stored in a minimum of space or they may be packed in a minimum space in cartons for shipment.

It is preferable to have a plurality of aligned apertures or slots 44 in the bottom portion 10 of the infant carrier 8, intermediate the length thereof and spaced outward near the respective sides 14 so that a strap 46 may be passed therethrough to enable a latch member 48, on one end of the strap, to engage an eye 50, on the other end of the strap, to secure an infant within the carrier 8.

*Installation*

To install the infant carrier 8 onto a shopping cart 1, the baby carrying seat 42 is unfolded into a position, as shown in FIGS. 1 and 2, wherein an infant would normally occupy the seat in a sitting position. With the seat in this position, transverse bar 6 on the back or partition member 4 of the baby carrying seat 42 will be in position as shown in FIGS. 1 and 2. With the shopping cart 1 in this position, an infant carrier 8, as shown in FIG. 3, may be adjusted by moving the U-shaped support brace 18 outward from the position indicated in dashed outline, to that indicated in full outline; and with the clips 34 attached to the transverse handle 2, each clip 38 is moved until it will fit on transverse bar 6 in engaged relation, whereupon the set screws 26 are tightened, thereby to hold the infant carrier 8 in adjusted relation on the shopping cart 1.

With the infant carrier 8 in the position as described above, the infant is placed on the carrier so that the head will be in a somewhat elevated position, with the feet against end portion 12, whereupon the strap 46 is connected by latch member 48 engaging eye 50 to secure the infant within the carrier 8. This will enable carefree shopping with a minimum of danger of the infant falling from the carrier.

Having thus clearly shown and described the invention, what is claimed as new and desired to be secured by Letters Patent is:

1. An infant carrier for attachment to a shopping cart, which carrier comprises;
    (a) a bottom portion,
    (b) an up-turned end portion,
    (c) sides connected to said bottom portion and to said up-turned end portion,
    (d) at least one downwardly facing, open end clip secured on the outer side of the up-turned end portion, intermediate the height thereof, the horizontal axis of said clip being substantially parallel with the bottom portion of the infant carrier,
    (e) a support member secured to the lower side of said bottom portion and extending therebelow,
        (1) at least one downwardly facing, open end clip associated with the lower side of said support member and being substantially parallel to said first mentioned, downwardly facing clip,
    (f) linkage connected to the bottom portion of said infant carrier and to said support member to hold said support member in secure relation with respect to the bottom portion of said infant carrier, and
    (g) said downwardly facing, open end clips adapted to engage spaced apart, transverse members on a shopping cart to hold the infant carrier in fixed relation with respect thereto.

2. An infant carrier for attachment to a shopping cart as defined in claim 1; wherein
    (a) said downwardly facing, open end clips are each resilient.

3. An infant carrier for attachment to a shopping cart as defined in claim 1; wherein
    (a) said linkage comprises at least two rods,
        (1) said rods being movable longitudinally relative to each other, and
        (2) fastening means fixedly securing said rods in adjusted relation to enable the bottom portion of said infant carrier to be angulated with respect to the shopping cart.

4. An infant carrier for a shopping cart, as defined in claim 1; wherein
    (a) said downwardly facing, open end clips are each resilient,
        (1) said clips on said up-turned end portion comprising two clips which are spaced apart laterally from a medial plane passing longitudinally through the infant carrier at a right angle to the axis of said clips,
        (2) said clips on the lower side of said support member comprising two spaced apart clips, one on each side of said medial plane passing longitudinally through said infant carrier,
    (b) said support member, which is secured to the lower side of said bottom portion, being pivotally secured thereto,
    (c) said linkage connected to said bottom portion of said infant carrier and to said support member comprising two rods, one rod being pivotally connected to the bottom of said infant carrier and the other rod being pivotally connected to said support member, which rods lie in a common plane with the respective inwardly extending ends of said rods being in over-lapping relation, (1) said rods being selectively movable longitudinally with respect to each other, and
(2) fastening means associated with said inwardly extending ends of said longitudinally movable rods to secure said rods in longitudinally adjusted relation to enable the bottom portion of said infant carrier to be angulated with respect to the shopping cart.

References Cited

UNITED STATES PATENTS

| | | | |
|---|---|---|---|
| 2,904,237 | 9/1959 | Wasyluk | 224—42.45 |
| 3,061,374 | 10/1962 | Grosfillex | 297—457 X |
| 3,206,247 | 9/1965 | Johnson | 297—377 X |
| 3,272,556 | 9/1966 | Rocker | 297—377 X |

HUGO O. SCHULZ, *Primary Examiner.*